(12) United States Patent
Khmelev et al.

(10) Patent No.: US 11,960,909 B1
(45) Date of Patent: Apr. 16, 2024

(54) SYSTEM AND METHOD FOR DYNAMIC USER INTERFACE EXPERIENCES

(71) Applicant: UIPCO, LLC, San Antonio, TX (US)

(72) Inventors: Yevgeniy Viatcheslavovich Khmelev, San Antonio, TX (US); Robert Andrew Massie, San Antonio, TX (US); David Campbell, San Antonio, TX (US); Gregory Brian Meyer, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/651,253

(22) Filed: Feb. 16, 2022

Related U.S. Application Data (60) Provisional application No. 63/152,649, filed on Feb. 23, 2021.

(51) Int. Cl.
*G06F 9/451* (2018.01)

(52) U.S. Cl.
CPC .................. *G06F 9/451* (2018.02)

(58) Field of Classification Search
CPC ....................................................... G06F 9/451
See application file for complete search history.

(56) References Cited

U.S. PATENT DOCUMENTS

| | | | | |
|---|---|---|---|---|
| 9,529,522 B1* | 12/2016 | Barros | .................. | G06F 3/0482 |
| 2003/0080185 A1* | 5/2003 | Werther | ................ | G07F 19/203 |
| | | | | 235/380 |
| 2007/0091010 A1* | 4/2007 | Richardson | ............. | H04L 67/02 |
| | | | | 345/2.1 |
| 2007/0300185 A1* | 12/2007 | Macbeth | ................. | G06F 9/451 |
| | | | | 715/764 |
| 2008/0154859 A1* | 6/2008 | Chi | ........................ | G06F 16/951 |
| 2011/0029509 A1* | 2/2011 | Kumthekar | ......... | G06F 16/9535 |
| | | | | 707/723 |
| 2012/0311584 A1* | 12/2012 | Gruber | ............. | G06Q 10/06311 |
| | | | | 718/100 |
| 2014/0032062 A1* | 1/2014 | Baer | ........................ | G07C 5/08 |
| | | | | 701/99 |
| 2015/0206210 A1* | 7/2015 | Liberty | ................. | H04W 4/021 |
| | | | | 455/414.1 |
| 2015/0242091 A1* | 8/2015 | Lu | ........................ | G06F 3/04817 |
| | | | | 715/708 |
| 2020/0320894 A1* | 10/2020 | Davidson | ............... | G06Q 30/01 |
| 2021/0045043 A1* | 2/2021 | Shannon | ............... | H04W 24/10 |
| 2021/0350307 A1* | 11/2021 | Price | ................ | G06Q 10/06398 |

\* cited by examiner

*Primary Examiner* — Daniel W Parcher
(74) *Attorney, Agent, or Firm* — Plumsea Law Group, LLC (57) ABSTRACT

A method and system of providing users with session-specific layouts during access of an application based on contextual data. The system identifies contextual data for each application access session and associates the contextual data with a particular in-app activity. The in-app activity corresponds to a task that is typically performed by the first user when the specific contextual data is detected. The contextual data can include location data, time and date data, and device type data.

11 Claims, 10 Drawing Sheets

SYSTEM AND METHOD FOR DYNAMIC USER INTERFACE EXPERIENCES

CROSS-REFERENCE TO RELATED APPLICATION

This application claims the benefit of U.S. Provisional Patent Application Ser. No. 63/152,649 filed on Feb. 23, 2021 and titled "System and Method for Dynamic User Interface Experiences", the disclosure of which is incorporated by reference in its entirety.

TECHNICAL FIELD

The embodiments relate generally to methods and systems for modifying an appearance of a software application for a user, and specifically to adjusting the main app interface presented to a user based on the user's past in-app activity patterns.

BACKGROUND

User interfaces for APIs (application programming interfaces) can be used to facilitate an end user's interaction with, for example, a distributed computing environment (e.g., a web-based application), or an application residing wholly on a single computer system (e.g., a stand-alone application). Some interfaces, such as those used in the commercial or business enterprise context, have a layout of objects and widgets that is common to all versions of the interface. For example, two users will find the presentation experience of the interface to be the same. This uniform layout of objects and widgets is typical, although it does not usually serve as the most efficient layout for a particular end-user's purposes.

Although there have been various sophisticated methods developed by electronic content providers to enhance the user's online experience, users have not been provided with personalized interfaces based on patterns of the user's individual behavior and in-app activity.

There is a need in the art for a system and method that addresses the shortcomings discussed above.

SUMMARY

In one aspect, a method for adjusting an appearance of a user interface of an application in response to session-specific user data is disclosed. The method includes a first step of detecting, during a first application access session, at least a first contextual data from a first user device associated with a first user, and a second step of recognizing that a first in-app activity is associated with a detection of the first contextual data. The method also includes a third step of automatically adjusting, during the first application access session, an appearance of a main interface for the application to include a first layout providing one or more options related to the first in-app activity.

In another aspect, a method of modifying a user interface based on intelligently generated associations between user activity and session specific data includes a first step of receiving, via an application running on a first user device and during a first user session for a first user, a first input corresponding to a selection of a first in-app activity, and a second step of detecting at least a first contextual data from the first user device during the first user session. The method also includes a third step of determining, at a first time and based at least on previous in-app activity by the first user, that use of the application by the first user has a high likelihood of including the first in-app activity when the first contextual data is detected, and a fourth step of linking the first contextual data to the first in-app activity. In addition, the method includes a fifth step of presenting, during a second user session in which the first contextual data is detected, a modified main interface comprising a first layout that provides one or more options related to the first in-app activity.

In another aspect, a system is disclosed for adjusting an appearance of a user interface of an application in response to session-specific user data. The system comprises a processor and machine-readable media including instructions which, when executed by the processor, cause the processor to detect, during a first application access session, at least a first contextual data from a first user device associated with a first user, and to recognize that a first in-app activity is associated with a detection of the first contextual data. The instructions further cause the processor to automatically adjust, during the first application access session, an appearance of a main interface for the application to include a first layout providing one or more options related to the first in-app activity.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a system and method for identifying recurring in-app activity patterns for a user and displaying a specific user interface (UI) for that user based on the identified patterns. The proposed system and method provide an application interaction experience that is tailored to a user's preferences without requiring manual input from the user regarding the UI presentation. In one example, the appearance of the application can be modified to match a user's recurring needs based on the day, time, and/or device, also referred to herein as contextual cues. Thus, passive behavior by the user can cause dynamic changes in layout of their interface. The system is configured to detect regular patterns and adapt subsequent access sessions to the user based on their predicted needs. In other words, simply by engaging in their normal day-to-day in-app activities, the user's UI experience can be customized to better serve each user's needs.

In some embodiments, the proposed system and method allow for the personalization of a user's (such as a customer or other client) experience with a particular app and enable a streamlined path to the app functions that are used regularly by that specific user. The proposed systems use machine learning algorithms embedded in the app to personalize the user's app experience based on their in-app behavior and other app or device data that the member has elected to share with the app service. The machine learning algorithms determine which options and interface style would be optimal for a particular user based on contextual cues. The app can then present options that are most likely to be of relevance to the particular user, thereby significantly improving the user's in-app experience. In some cases, the appearance of the menu options in the app will be dynamically reorganized to highlight or prioritize presentation of those functions that the user accesses most frequently. In one example, the appearance of the app can be adjusted based on information collected during several user interaction sessions with the app. In another example, the app can offer multiple "personas" for the same member, whereby the app experience is modified based on contextual segregation factors such as the time of day/week, products selected by the user, device location, previous user interactions and activity history with the app, etc.

As used herein, the term "user", "customer", and/or "member" should be understood tor refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Figure 1:
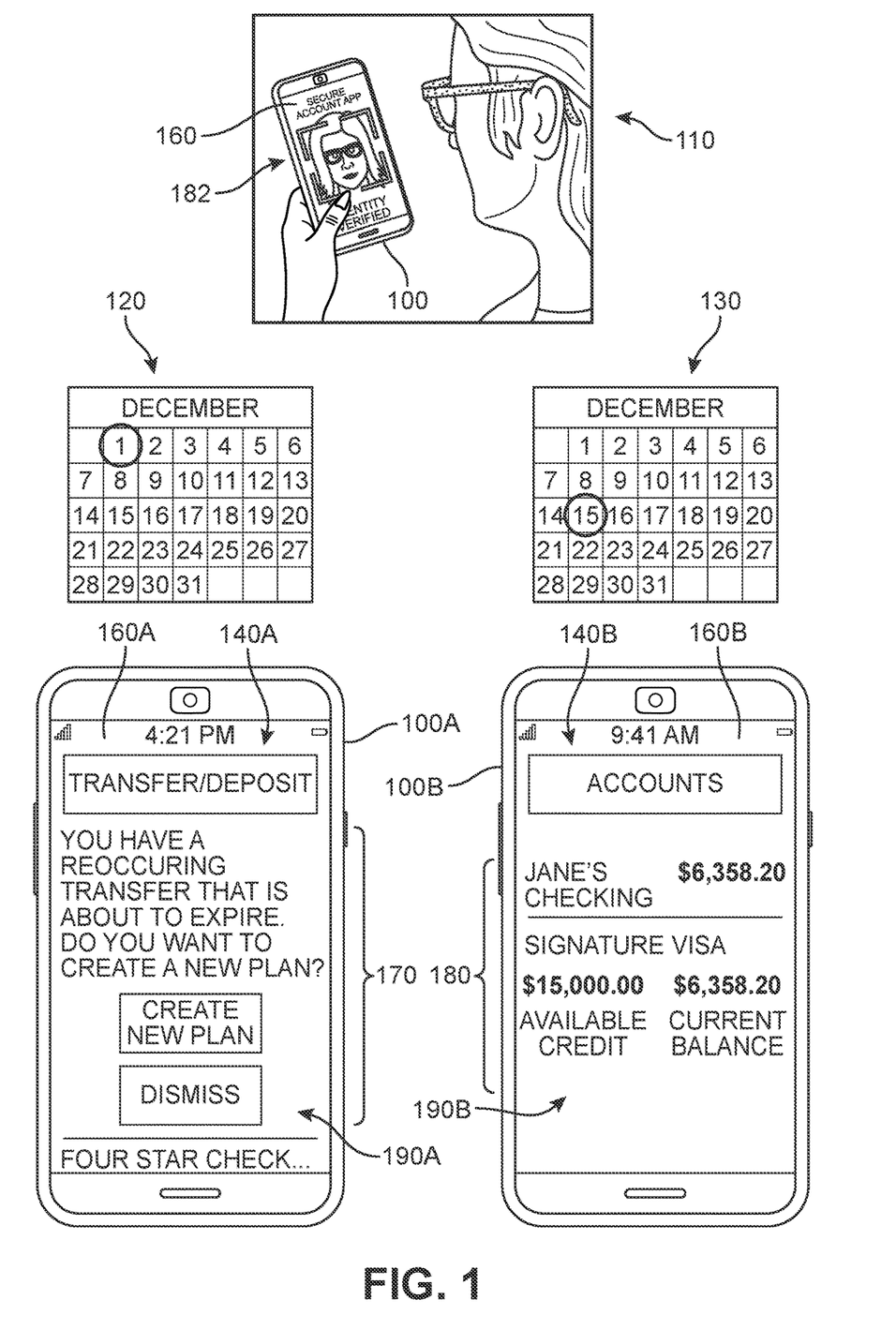
FIG. 1 is an illustration of an example of a user accessing an application on a first day and on a second day, and each day is associated with different main page layouts, according to an embodiment.

Referring now to FIG. 1, for purposes of introduction, a first user 110 of a first app 160 is shown attempting to log into the first app 160 via a first device 100. As a general matter, the first device 100 can include an electronics unit comprising a plurality of different components, such as a user interface component (e.g., a touchscreen display, keyboard, mouse, speakers, etc.), a user interface module, a processor, and/or a communication module. For purposes of this example, first device 100 can be a desktop computer, laptop, tablet, or other computing device configured for connection to a network. Furthermore, the first device 160 includes one or more processors and memory. Memory may comprise a non-transitory computer readable medium. Instructions stored within memory may be executed by the one or more processors. A communication module may allow the first device 160 to communicate wirelessly. In different embodiments, the first device 160 may communicate with a mobile computing device, wireless devices, and/or with networked computers, for example over the internet. In this case, the communication module is a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In some embodiments, the app is available at least in part as a local resource stored on the first device 100, while in other embodiments, some or all features and modules of the system are made available via a remote cloud service or network. In FIG. 1, an optional authentication page 182 is presented to allow the first user 110 to access their account that is linked to the first app 160. For purposes of this example, the first app 160 provides various banking and transactional services. However, in other embodiments, the first app 160 can be any other type of application configured for recurring use by registered account members of the app.

In different embodiments, based on previously detected patterns of user in-app activity, the first app 160 can be configured to present different main page layouts to a single user. In FIG. 1, the reference letter "A" indicates content associated with a first app layout (presented to the user on a first date), and the reference letter "B" indicates content associated with a second app layout (presented to the user on a second, different date). In this case, it may be understood that over the past few months or more, first user 110 has engaged in multiple access sessions with first app 160. When first user 110 accesses the first app 160 on the first of the month (first date 120), it is often to transfer and/or deposit funds; in contrast, her access sessions on the 15$^{th}$ of the month (second date 130) typically are used to review her account details. In different embodiments, the first app 160 includes provisions for tracking the patterns of usage by a user in order to present an app layout that is more likely to be suited to the user's needs for that day/time.

For example, if the first user 110 logs into the first app 160A on a first date 120, she is directed to a first welcome page with a first main header 140A ("Good morning, Alex") and a first main interface 190A, where the first main interface 190A includes first app content 170, such as a landing page, top page, welcome page, home page, or other initial app interface. When the first user 110 logs into the first app 160B on a second date 130, she is instead directed to a second, different welcome page. In this case the second welcome page includes with a second main header 140B ("Good morning, Alex") that is substantially similar to the first main header 140A. However, a second main interface 190B includes second app content 180 that differs from first app content 170 of first main interface 190A. In FIG. 1, first app content 170 primarily includes options for the first user 110 to transfer or deposit funds, while second app content 180 primarily includes options for reviewing account details.

Figure 2:
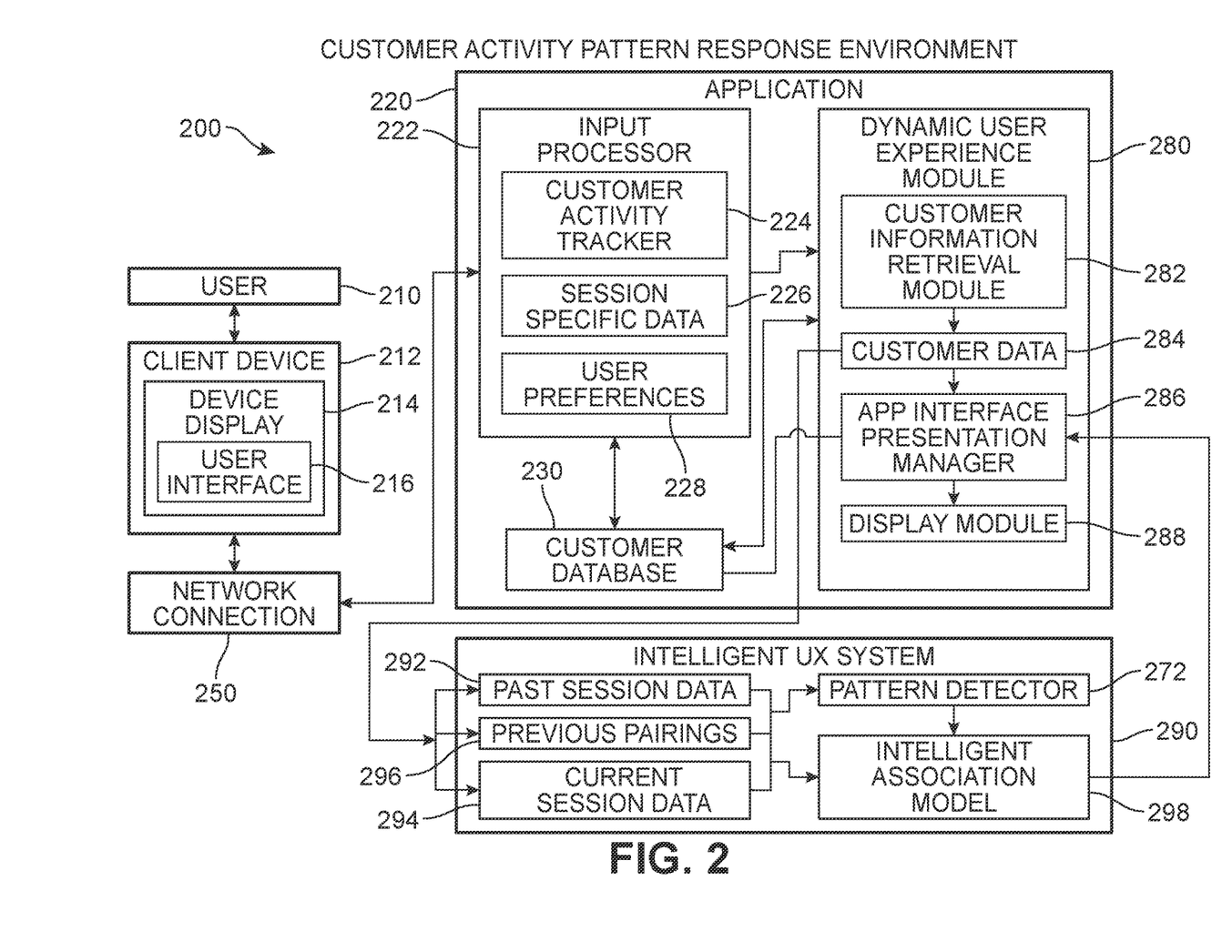
FIG. 2 is a schematic diagram of a system for automatically and dynamically providing a customized main page for an application based on a user's in-app activities, according to an embodiment.

In order to provide the reader with a greater appreciation of the embodiments, FIG. 2 depicts an overview of an embodiment of a customer activity pattern response environment ("environment") 200 in which customer activity is tracked and used to determine which interface layout should be presented to a customer during a particular app access session. In addition, in some embodiments, the environment 200 includes an intelligent user experience system ("intelligent system") 290 configured to provide customized instructions to application 220 in order to learn, improve, and cause to display the most relevant app layout to the user during each access session.

As shown in FIG. 2, the environment 200 includes a client computing device ("client device") 212 configured to communicate with application 220 over network connection 250. While the various components of environment 200 are shown as being accessed through a cloud network and/or stored on a cloud-based server in FIG. 2, in other embodiments some or all components described herein can be reside in client device 212 and/or a remote server.

In different embodiments, the client device 212 includes a device display ("display") 214 that can present information and media for the application ("app") 220. As noted above, app 220 can represent a product/service support software that is associated with a provider of the product/service of interest to a customer or other user 210 of the app 220. For example, the user 210 can receive and send information through a user interface 216 that may be presented on the device display 214. The user interface 216 and display 214 may represent a common component or may represent separate physical or functional components. In some embodiments, display 214 may be a touchscreen, allowing the customer to interact with the user interface directly by touch. The user interface may refer to an operating system user interface or the interface of one or more software applications that may run on the client device 212, such as app 220.

In different embodiments, the user 210 may, based on the services or features provided by app 220, access app 220 for different reasons. In different embodiments, the app 220 can represent an interactive platform that provides a site from which the customer can create and maintain an account, access information and options related to the entity and its products or services, perform various tasks, review and/or modify their account details, and/or communicate with personnel of the app-providing entity. For example, the user 210 can enter various inputs via client device 212 that are received by an input processor 222 of the app 220. In some embodiments, the app 220 will generate a log of these inputs and selections via a customer activity tracker ("tracker") 224. In other embodiments, the tracker 224 may be a component that is external to app 220. The tracker 224 will be in communication with a customer database 230 that will store the information as a short or long-term record associated with the customer's account. In some embodiments, tracker 224 can be configured to automatically transfer the data in real or near real-time to the customer database 230, upon the completion of a specific task by the customer, and/or in response to specific events that occur during the customer's access session.

In the embodiment of FIG. 2, the input processor 222 is also configured to receive contextual data about the user's current session, such as but not limited to session specific data ("session data") 226. The session data 226 can encompass one or more of date, time, device type, device location, and/or browser configuration, as well as other local factors such as weather, session frequency on a given day or other period of time, etc. In addition, any (intentional) user preferences 228 regarding the layout or appearance of the user interface 216 will also be received by input processor 222. In some embodiments, the user preferences 228 will override any automated recommendations for modifying the appearance of the interface. For example, in some embodiments, user feedback and/or user selections about the layout of the app during or after a particular session can determine the appearance of the interface for some or all of the subsequent access sessions.

In different embodiments, when a request for login by the user 210 has been received by app 220, a dynamic user experience module ("dynamic module") 280 can be configured to automatically generate an interface layout that has a high probability or likelihood of best serving the user's immediate motivations for the access session. For example, when input processor 222 receives a login request, the app 220 may identify the account associated with the user. This information is provided to dynamic module 280, causing a customer account information retrieval module 282 to access the recent or related activity from the customer database 230 for the account associated with the customer identifier. The relevant information is received by the dynamic module 280 as customer data 284. The information is then shared with an app interface presentation manager 286 that is also in communication with intelligent system 290.

In some embodiments, in cases where there has been no or otherwise insufficient user activity at the time of the user login for the system to determine the user's preferred layout, it can be understood that the system can be configured to present a modified user interface that has been selected based on a subset of users of the same application that match the device user's demographics, and whose preferences and/or layout is known at the time of usage. This can serve an initial or default interface in some cases, from which training of the intelligent system can occur. Thus, in some embodiments, the resident intelligent system—without any additional external application owner input—can adapt to the user's real-time behavior and modify its own training inputs to provide a personalized main interface of the application.

In different embodiments, intelligent system 290 is configured to receive customer data 284 as input for an intelligent association machine learning model ("model") 298. In some embodiments, the customer data 284 can be segregated or otherwise classified for use by the model 298 to include specific types of information (contextual cues), such as past session data 292 (including session specific data and user activity), current session data 294 (including session specific data and user activity), and previous pairings or links based on customer app usage patterns (including customer feedback about those pairings). In this case, "pairings" or "links" refers to associations or relationships identified or generated by model 298 between a specific customer activity or task and some contextual data. These pairings can be determined in large part based on recurring patterns of use detected over time and multiple sessions by a pattern detector 272. Some examples of contextual cues/input types that may be provided to model 298 through these data can include, but are not limited to, the time between logging in and selecting an option/feature in the app, the first option selected by the user after they log in, as well as the next series of subsequent options (and the order in which these options are selected), the amount of time the user spends interacting with a specific content portion of the app, time/date, weather, GPS and/or other location data from the user's device, device type data from the user's device, etc.

These data can be used by the model 298 to determine whether the current contextual (session specific) data is associated with a particular user activity/task based on past data. If there is sufficient data to make such a determination, the model 298 can be configured to provide output corresponding to the most likely task or activity to app interface presentation manager 286. The app interface presentation manager 286 uses this information to select the appropriate layout (for example, from a preconfigured interface layout repository for the app) that matches, aligns with, and/or is best configured to allow the user to perform the designated task or activity. This layout is then presented to the user 210 via a display module 288 as the (modified) main page when they log into the app 220 when the linked contextual data is also detected.

In addition, in some embodiments, the model 298 can be configured to learn over time. In some embodiments, the model 298 can receive user feedback directly from user 210 (i.e., as manual input) and/or automatically when new or changing usage patterns are detected. In one embodiment, if the provided interface layout successfully displayed the options and/or features the user had desired, as reflected by data collected by customer activity tracker 224, the model's association is reinforced. For example, if the user avoids the options provided by the selected layout and instead immediately navigates to a different feature, menu, or site page, the model can remove the association/link or assign the association a lower probability or likelihood of representing the layout with the desired options/features. In addition, or alternatively, the app 220 may request that the user submit feedback regarding their experience, including whether the proffered layout was aligned with their intended tasks during the current access session, or via communications to the user at a later time asking about their experience. Based on the feedback and model can reassess the value of that recommendation for future instances of the same or similar contextual data. In different embodiments, the model 298 can also have access to an electronic repository of previous user sessions/customer records. The records can have a wide range of session knowledge elements, including but not limited to whether the outcome of the session was deemed successful (e.g., the user selected options from the proffered layout), or unsuccessful (e.g., the user immediately navigated away from the proffered layout). In some embodiments, the customer feedback may alternatively or additionally be stored in the repository.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3A:
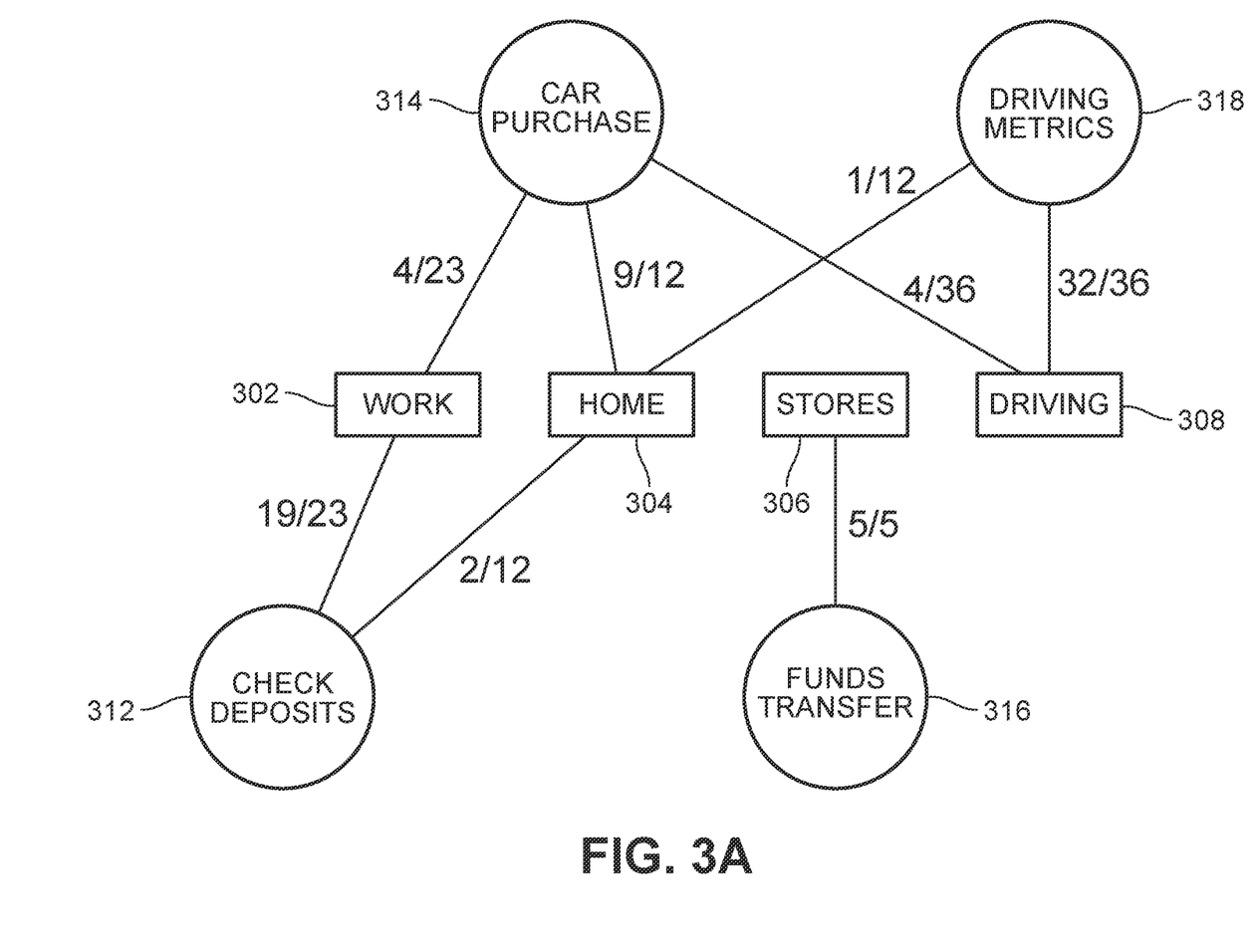
FIG. 3A is a schematic diagram of an example of a user's in-app activity patterns, according to an embodiment.

Referring now to FIGS. 3A-6, one example of an implementation of an app configured with a dynamic user experience system ("system") based on location is presented. In FIG. 3A, an example schematic diagram illustrates a possible record of app usage history for one user and the locations (a type of contextual data) in which the usage occurred. In this example, a multi-purpose app that provides a broad range of services, such as banking (e.g., check deposits 312 and funds transfer 316) and vehicle support (e.g., car purchases 314, driving metrics 318). Simply for purposes of illustration, only four locations are depicted (work 302, home 304, stores 306, and driving/in-car 308). However, in other embodiments, fewer, alternate, or additional locations may be registered by the app as frequent-use locations, such as but not limited to school, daycare, friends or family members' homes, frequent travel sites, etc.

For each location, the system has recorded the primary in-app activity that occurred for the user over a period of time (e.g., day(s) week(s), month(s), year(s)). For this example, over the last month, the user is tracked as having accessed the app from work 23 times. The user used the app to deposit checks 19 out of 23 of those times (~83%), and to peruse cars for purchase the remaining 4 out of 23 times (~17%). In addition, the user was tracked as having accessed the app from home 12 times over the same month. The user used the app to peruse cars for purchase 9 out of 12 times (~75%), to deposit checks 2 out of 12 times (~17%), and review their driving metrics 1 out of 12 times (~8%). The user was also tracked as having accessed the app from various stores 5 times in the last month, and in each of those instances the app was used to transfer funds between their accounts (100%). Finally, the user was tracked as having accessed the app from their vehicle 36 times over the same month. In this case, the user used the app to review their driving metrics 32 out of 36 times (~89%), and to peruse car options for purchase the remaining 4 out of 36 times (~11%).

In some embodiments, in part based on these metrics, the system can be configured to detect patterns of usage and determine whether an association between a location and a particular in-app activity is warranted. In one embodiment, the association can be created if the percentage is above a pre-determined threshold (e.g., above 50%). In another embodiment, the association can be created if the in-app activity only occurs at a given location. In some cases, the association can be created if a majority of access sessions at that location involve the designated in-app activity. In addition, the user may themselves provide input regarding their layout preferences at any of the locations, which would then override the system's associations for that location. The period of time over which the patterns are established can be selected by the user or preset by the system. In some embodiments, the period of time can vary for one location versus another depending on the number of access sessions occurring at those locations and the data collected. For example, the pattern for work may be detected within a week of app use, while the pattern for stores may be detected only after three months.

Figure 3B:
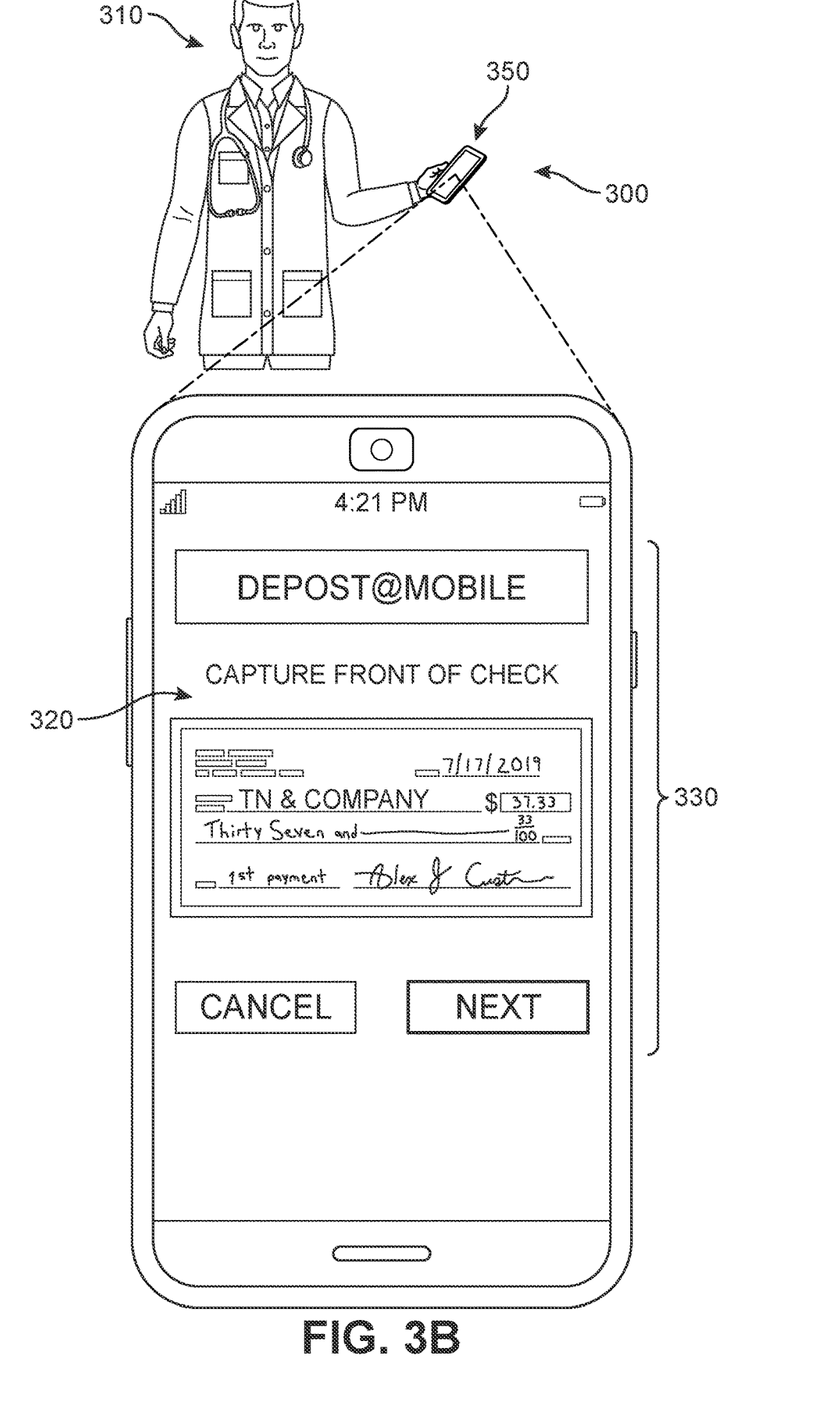
FIG. 3B is an illustration of a first user accessing an application from their work-site, according to an embodiment.
Figure 4:
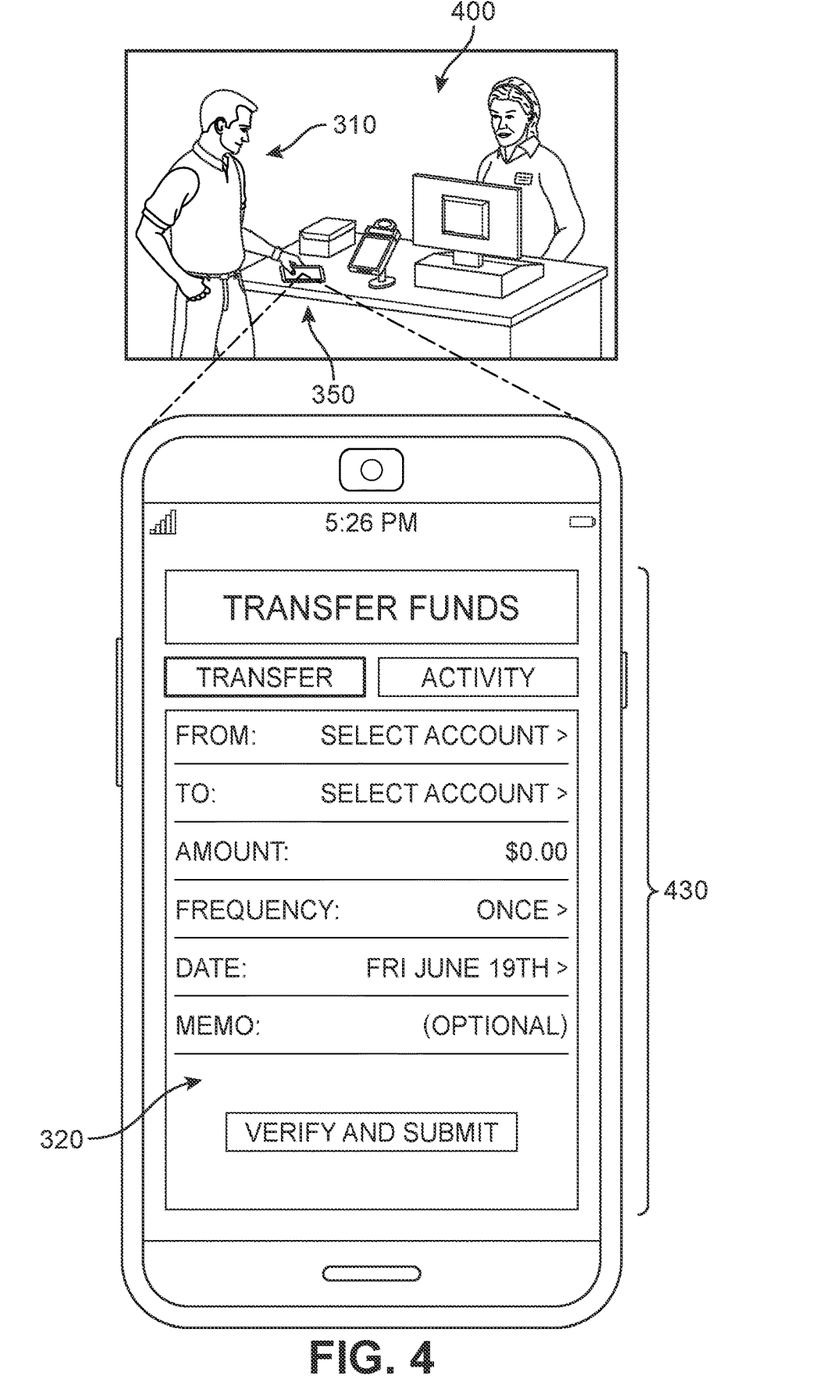
FIG. 4 is an illustration of the first user accessing the application from a retail store, according to an embodiment.
Figure 5:
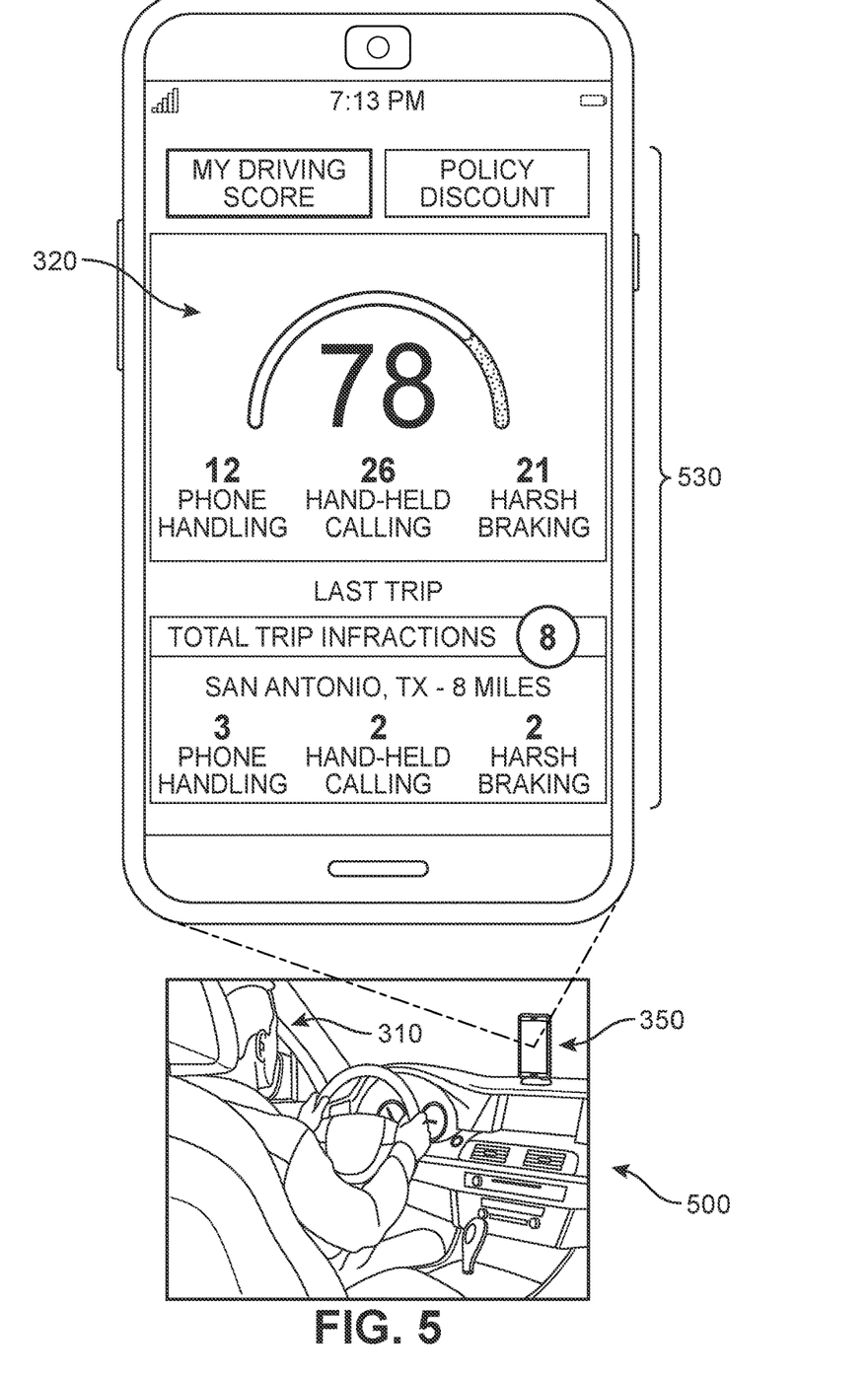
FIG. 5 is an illustration of the first user accessing the application while driving, according to an embodiment.
Figure 6:
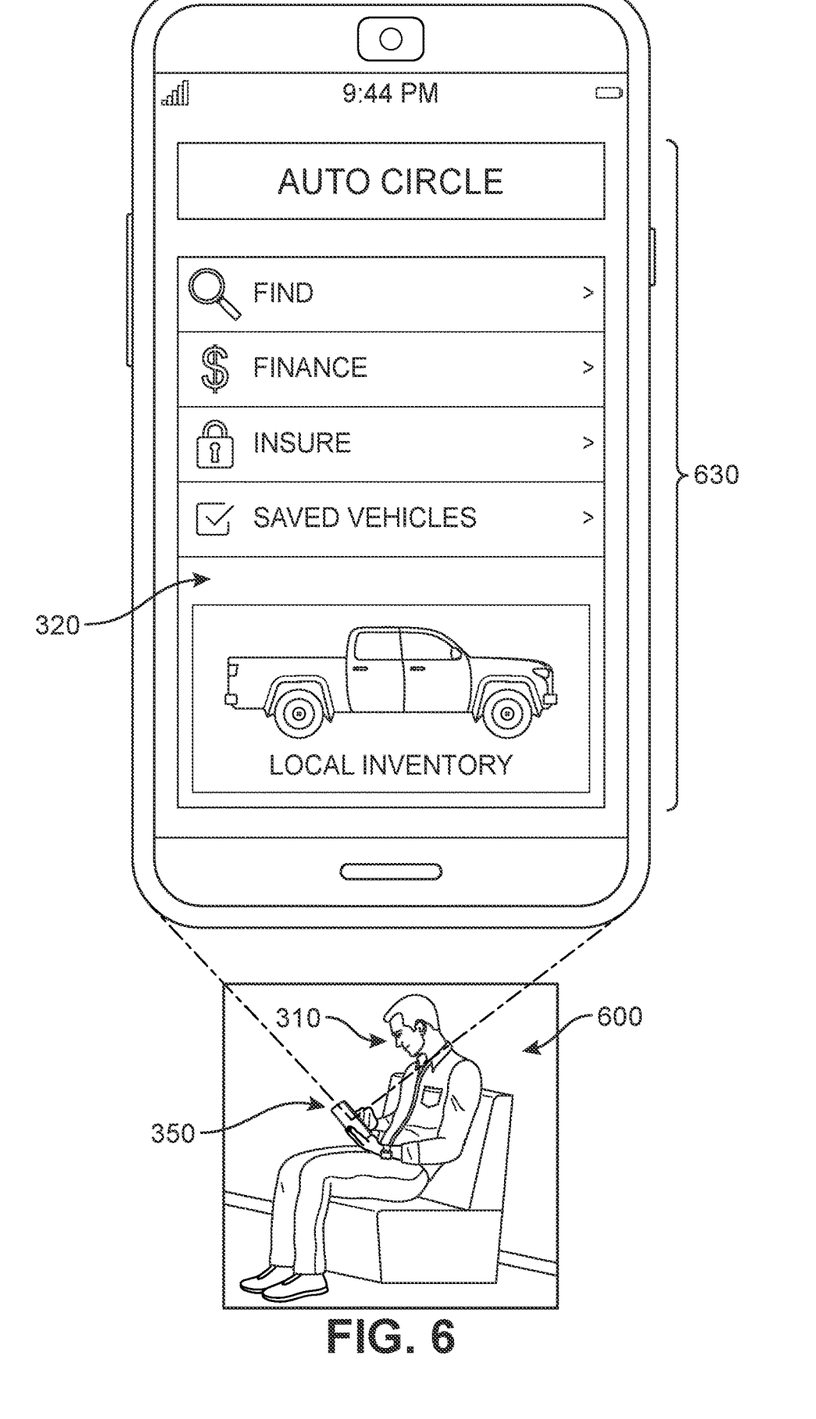
FIG. 6 is an illustration of the first user accessing the application from their home, according to an embodiment.

Referring now to FIGS. 3B-6, examples of an application of the data shown in FIG. 3A are provided. In FIG. 3B, a second user 310 is depicted at a work location 300 accessing an app 320 on his mobile device 350. In this case, based on the output of the intelligent association machine learning model that incorporated data shown in FIG. 3A, the app 320 opens with a first main interface 330 with a check deposit feature(s)/option(s) focus. For purposes of this description, a layout or interface content with a particular "focus" is directed to a presentation of app content that primarily or at a minimum includes at least one option related to the focused content. In contrast, as shown in FIG. 4, when the same second user 310 accesses the app 320 later in the day (e.g., during his lunch break) from a retail store location 400, he is presented or welcomed with a second main interface 430 that has a transfer funds feature(s)/option(s) focus. Similarly, as shown in FIG. 5, when the second user 310 is driving home later that evening in vehicle 500 and accesses the app 320, the initial layout is that of a third main interface 530 in which there is a driver metrics feature(s)/option(s) focus. Finally, after the second user 310 has arrived at his home location 600, as shown in FIG. 6, his access of app 320 results in a presentation of a fourth main interface 630 in which there is a car purchase feature(s)/option(s) focus.

Figure 7:
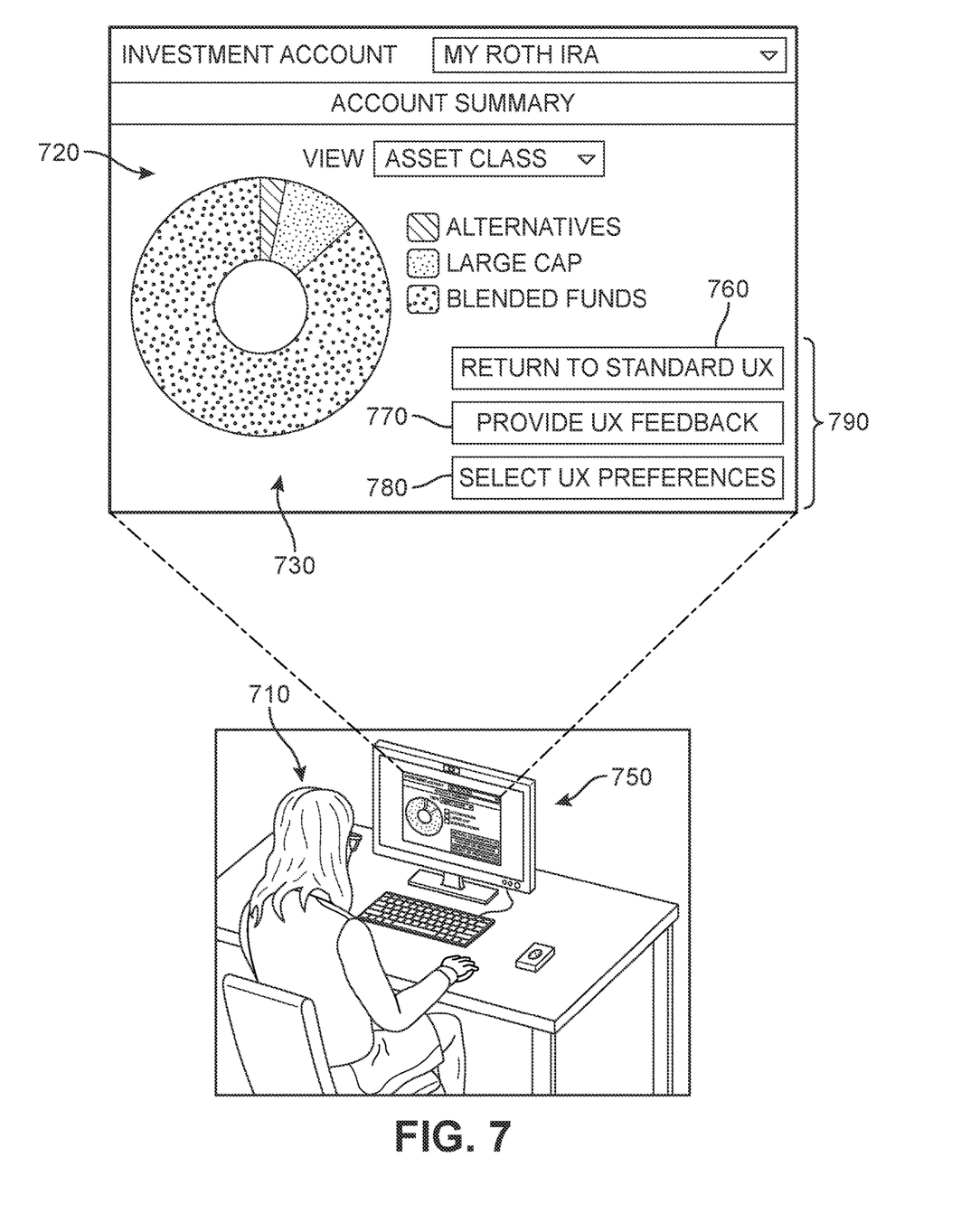
FIG. 7 is an illustration of a second user accessing an application from a desktop, according to an embodiment.
Figure 8:
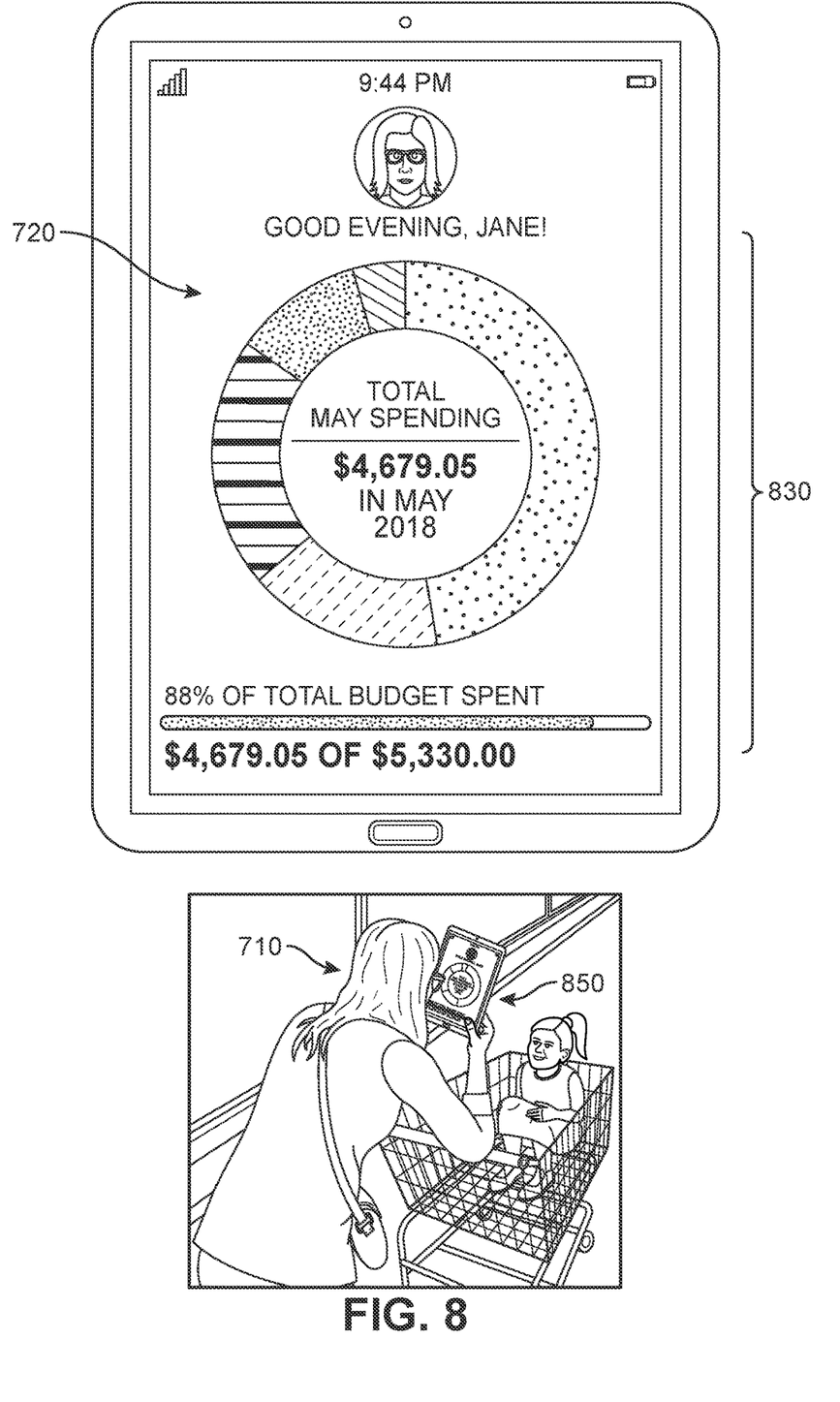
FIG. 8 is an illustration of a second user accessing an application from a tablet, according to an embodiment.

An alternate example of the proposed embodiments is depicted with respect to FIGS. 7 and 8 in which the contextual data corresponds to a device type, rather than a location. For purposes of this example only, it can be understood that the system has determined that the user typically engages in investment banking through the app when the app is accessed from his desktop computer, and typically engages in a review of spending and budget activity from his tablet. Thus, in FIG. 7, as a third customer 710 initiates an access session of app 720 via a desktop computing device 750, he is welcomed with a first main interface 730 in which the investment feature(s)/option(s) are provided. Furthermore, as noted earlier, in some embodiments, the app can include provisions for receiving customer feedback and preferences. An example of this is shown in FIG. 7, where a plurality of selectable options 790 are also presented on the interface. In this case, options 790 include a first option 760 for triggering a direct return to the standard or default welcome page or presentation layout for the app (i.e., what would be shown to users for whom no associations have been generated), a second option 770 for providing the app with feedback regarding the presentation experience, and a third option 780 for selecting or changing preferences regarding the layout options. In other examples, fewer or greater options may be provided. While options 790 are shown only in the example of FIG. 7, it should be understood that the options may be made available or accompany any other interface layout arrangement, and/or be accessible through standard user account menu options. In contrast, when the same third user 710 initiates an access session of app 720 from his tablet device 850, as shown in FIG. 8, the app 720 opens with a second main interface 830 in which his spending habits and associated feature(s)/option(s) are presented.

As noted earlier, in other embodiments, different contextual cues may be used by the system in determining an association. For example, a user may access the app in the mornings to review his or her account details, and in the evenings to send money electronically to another person. Thus, the association may be based on the time of day. As another example, a user may access the app every Sunday to transfer funds, and every Wednesday to view his or her driving metrics. In this case, the association may be based on the day of the week. In still another example, the user may access the app on a specific date every year (e.g., his or her daughter's birthday) to deposit funds in their child's account. In this instance, the association may be based on the day of the year. In some embodiments, the user may access the app at a particular time of year (around the beginning of Fall school semester and Spring school semester) in order to make an installment payment on a school loan. In this case the association may be based on the time of year. As another example, the user may access the app when visiting their child at university in order to review the child's spending habits. In this case, the association may be a location that is visited only sporadically. Each of these associations can be used to modify the appearance of the app so that when the user first logs in or otherwise 'opens' the app, options providing tools for the activity that has been associated with the identified contextual cue will be presented first, or immediately after any initial welcome messages.

Figure 9:
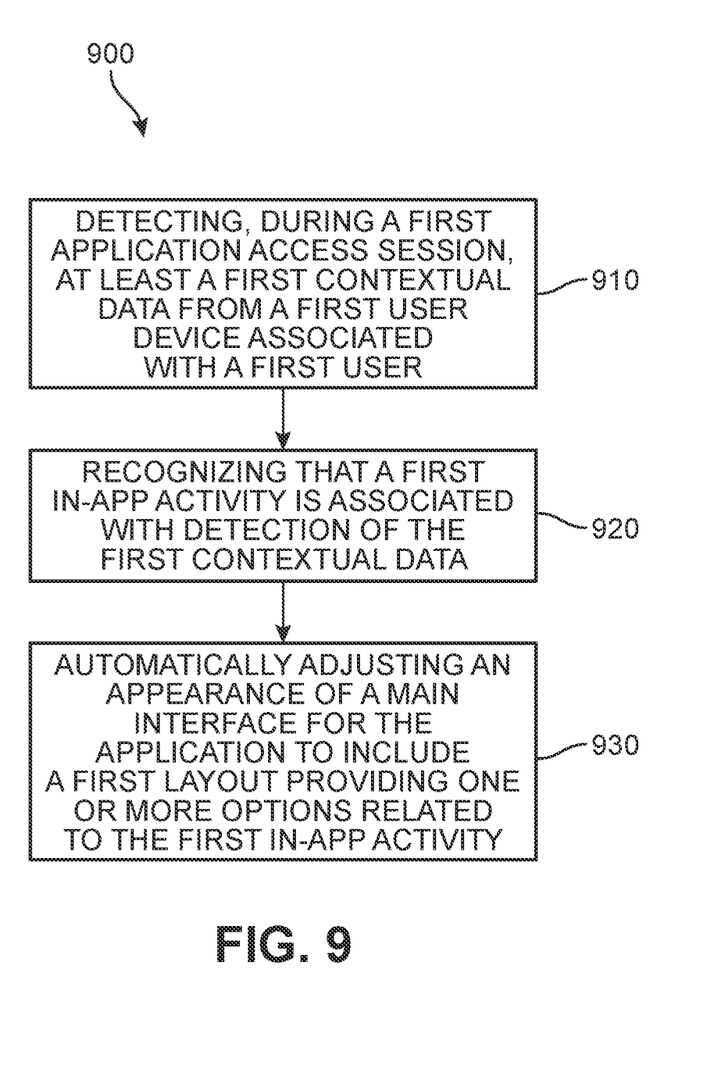
FIG. 9 is a flow diagram of a process for providing dynamically customized main pages to users based on contextual information and the user's in-app activity, according to an embodiment.

FIG. 9 is a flow chart illustrating an embodiment of a method 900 for adjusting an appearance of a user interface of an application in response to session-specific user data. The method 900 includes a first step 910 of detecting, during a first application access session, at least a first contextual data from a first user device associated with a first user, and a second step 920 of recognizing that a first in-app activity is associated with a detection of the first contextual data. In addition, the method 900 includes a third step 930 of automatically adjusting (or causing to adjust), during the first application access session, an appearance of a main interface for the application to include a first layout providing one or more options related to the first in-app activity.

In other embodiments, the method may include additional steps or aspects. In one embodiment, the first contextual data is one of a location, time, day, and device type. In another embodiment, the main interface is presented immediately following a successful login by the first user. In one example, the first layout differs from a second layout for the main interface that is presented to users as a default. In some other embodiments, the method can include additional steps of detecting, during a second application access session, a second contextual data from the first user device, determining, based on past activity for the first user, that a second in-app activity has a high likelihood of occurring when the second contextual data is detected, and automatically associating the second contextual data with the second in-app activity. In another embodiment, the method further includes steps of detecting, during a third application access session, the second contextual data from the first user device, and automatically adjusting (or causing to adjust) the appearance of the main interface to include a second layout providing one or more options related to the second in-app activity.

Other methods can also be contemplated within the scope of this disclosure. For example, a method of modifying a user interface based on intelligently generated associations between user activity and session specific data is disclosed. The method includes steps of receiving, via an application running on a first user device and during a first user session for a first user, a first input corresponding to a selection of a first in-app activity, and detecting at least a first contextual data from the first user device during the first user session. The method further includes a step of determining, at a first time and based at least on previous in-app activity by the first user, that use of the application by the first user has a high likelihood of including the first in-app activity when the first contextual data is detected. Furthermore, the method includes steps of linking the first contextual data to the first in-app activity, and then presenting, during a second user session in which the first contextual data is detected, a modified main interface comprising a first layout that provides one or more options related to the first in-app activity.

In different embodiments, this method may include additional steps or aspects. In one embodiment, the method also involves steps of detecting a second contextual data from a second user device during a third user session for the first user, determining that the second contextual data is linked to a second in-app activity that differs from the first in-app activity, and presenting, during the third user session, a modified main interface comprising a second layout that provides one or more options related to the second in-app activity.

In another example, the first contextual data is a first time of day, and the second contextual data is a second time of day that differs from the first time of day. In some embodiments, the first contextual data is a first day of the month, and the second contextual data is a second day of the month that differs from the first day of the month. In one embodiment, the first contextual data is a first location, and the second contextual data is a second location that differs from the first location. In some examples, the first user device differs from the second user device.

In some embodiments, the method can also include steps of determining, at a second time subsequent to the first time, that use of the application by the first user has a high likelihood of including the second in-app activity when the first contextual data is detected, removing the link between the first contextual data and the first in-app activity, linking the first contextual data to the second in-app activity, and presenting, during a fourth user session in which the first contextual data is detected, a modified main interface comprising the second layout.

In another aspect, a system is disclosed for adjusting an appearance of a user interface of an application in response to session-specific user data. The user's device has a pre-loaded intelligent system trained by a concurrence of interactions of other users of the same application. In some cases, a subset of such users of the same application has been selected to match the device user's demographics, if known and the time of usage, for training of the intelligent system that is pre-loaded onto the user's device. The resident intelligent system without any additional external application owner input can adapt to the user's real-time behavior and modify its own training inputs to provide a personalized main interface of the application.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for adjusting an appearance of a user interface of an application in response to session-specific user data, the method comprising:
   receiving, from a first user, a first request to log-in to the application;
   responsive to the first request, automatically presenting tot he first user a default first interface layout being generated based on preferences held by a subset of a plurality of other application users having the same demographics as the first user, the default first interface layout being generated in response to determining that the user's preferred layout cannot be determined from previous user activity, the default first interface being associated with a first in-app activity during a first application access session;
   receiving a navigation request from the first user for navigation away from the default first interface layout to a different second interface layout of the application that is associated with a second in-app activity, the navigation request being received immediately after the presentation of the default first interface layout;
   determining an outcome of the first application access session was unsuccessful based on the- navigation request being received immediately after the presentation of the default first interface layout;
   detecting, during the first application access session, at least a first contextual data, the first contextual data being based on one of a time of day, time of year, device type, local weather, season, and a location of the first user;
   removing, in response to determining the outcome of the first application access session was unsuccessful, an association between the first contextual data and the first in-app activity;
   linking, in response to determining the outcome was unsuccessful, the first contextual data with the second in-app activity;
   detecting, after the first application access session, both a second request to log-in to the application and a second contextual data that is the same as the first contextual data;
   responsive to the second log-in request and the second contextual data, automatically presenting to the first user, during a second application access session, the second interface layout providing one or more options related to the second in-app activity;
   detecting, after the second application access session, both a third request to log-in to the application and a third contextual data that differs from the first contextual data and the second contextual data; and
   responsive to the third request, and the third contextual data differing in type of data from the first contextual data and the second contextual data, automatically presenting to the first user during a third application access session the default first interface layout;
   wherein the default first interface is a car purchase interface, the second interface is a driving metrics interface, and the contextual data is a location of the first user.

2. The method of claim 1, wherein the second interface layout is presented during the second application access session immediately following a successful login by the first user.

3. The method of claim 1, wherein the first contextual data is a first time of day, and the third contextual data is a second time of day that differs from the first time of day.

4. The method of claim 1, wherein the first contextual data is a first day of the month, and the third contextual data is a second day of the month that differs from the first day of the month.

5. The method of claim 1, wherein the first contextual data is a first location, and the third contextual data is a second location that differs from the first location.

6. A system for adjusting an appearance of a user interface of an application in response to session-specific user data, the system comprising a processor and machine-readable media including instructions which, when executed by the processor, cause the processor to:
- receive, from a first user, a first request to log-in to the application;
- responsive to the first request, automatically present to the first user a default first interface layout being generated based on preferences held by a subset of a plurality of other application users having the same demographics as the first user, the default first interface layout being generated in response to determining that the user's preferred layout cannot be determined from previous user activity, the default first interface being associated with a first in-app activity during a first application access session;
- receive a navigation request from the first user for navigation away from the default first interface layout to a different second interface layout of the application that is associated with a second in-app activity, the navigation request being received immediately after the presentation of the default first interface layout;
- determine an outcome of the first application access session was unsuccessful based on the navigation request being received immediately after the presentation of the default first interface layout;
- detect, during the first application access session, at least a first contextual data, the first contextual data being based on one of a time of day, time of year, device type, local weather, season, and a location of the first user;
- remove, in response to determining the outcome of the first application access session was unsuccessful, an association between the first contextual data and the first in-app activity;
- link, in response to determining the outcome was unsuccessful, the first contextual data with the second in-app activity;
- detect, after the first application access session, both a second request to log-in to the application and a second contextual data that is the same as the first contextual data;
- responsive to the second log-in request and the second contextual data, automatically present to the first user, during a second application access session, the second interface layout providing one or more options related to the second in-app activity;
- detecting, after the second application access session, both a third request to log-in to the application and a third contextual data that differs from the first contextual data and the second contextual data; and
- responsive to the third request, and the third contextual data differing in type of data from the first contextual data and the second contextual data, automatically presenting to the first user during a third application access session the default first interface layout;
- wherein the default first interface is a car purchase interface, the second interface is a driving metrics interface, and the contextual data is a location of the first user.

7. The system of claim 6, wherein the second interface layout is presented during the second application access session immediately following a successful login by the first user.

8. The system of claim 6, wherein the first contextual data is a first time of day, and the third contextual data is a second time of day that differs from the first time of day.

9. The system of claim 6, wherein the first contextual data is a first day of the month, and the third contextual data is a second day of the month that differs from the first day of the month.

10. The system of claim 6, wherein the first contextual data is a first location, and the third contextual data is a second location that differs from the first location.

11. The system of claim 6, wherein the first in-app activity includes one of depositing a check and transferring funds between accounts.

* * * * *